US012501975B2

(12) United States Patent
Moy et al.

(10) Patent No.: US 12,501,975 B2
(45) Date of Patent: Dec. 23, 2025

(54) PROTECTIVE ANTENNA PACKAGE AND TRANSPORT UNIT THEREFOR

(71) Applicant: GALTRONICS USA, INC., Tempe, AZ (US)

(72) Inventors: Michael Moy, Ontario (CA); Minya Gavrilovic, Ontario (CA); Des Bromley, Ontario (CA); Jacob Van Beek, Ontario (CA); Sadegh Farzaneh, Ontario (CA); Brian Wixon, Ontario (CA)

(73) Assignee: GALTRONICS USA, INC., Tempe, AZ (US)

(*) Notice: Subject to any disclaimer, the term of this patent is extended or adjusted under 35 U.S.C. 154(b) by 246 days.

(21) Appl. No.: 18/035,654

(22) PCT Filed: Nov. 5, 2021

(86) PCT No.: PCT/US2021/058311

§ 371 (c)(1),
(2) Date: May 5, 2023

(87) PCT Pub. No.: WO2022/099053

PCT Pub. Date: May 12, 2022

(65) Prior Publication Data

US 2024/0008612 A1 Jan. 11, 2024

Related U.S. Application Data

(60) Provisional application No. 63/110,543, filed on Nov. 6, 2020.

(51) Int. Cl.
*A45C 11/00* (2006.01)
*A45C 5/14* (2006.01)
(Continued)

(52) U.S. Cl.
CPC ................ *A45C 11/00* (2013.01); *A45C 5/14* (2013.01); *A45C 13/36* (2013.01); *H01Q 1/12* (2013.01); *H01Q 1/42* (2013.01)

(58) Field of Classification Search
None
See application file for complete search history.

(56) References Cited

U.S. PATENT DOCUMENTS 4,467,939 A 8/1984 Warwick
5,385,236 A * 1/1995 Cowan .................. B65D 71/04 206/453
(Continued)

FOREIGN PATENT DOCUMENTS

CN 203392204 U 1/2014
CN 105826678 A * 8/2016 ............... H01Q 1/42
CN 209963254 U * 1/2020 ............... H01Q 1/22

OTHER PUBLICATIONS

International Search Report issued for International Patent Application No. PCT/US2021/058311, dated Feb. 3, 2022.
Written Opinion issued for International Patent Application No. PCT/US2021/058311, dated Feb. 3, 2022.
International Preliminary Report on Patentability issued for International Patent Application No. PCT/US2021/058311, dated May 8, 2023.

*Primary Examiner* — Crystal L Hammond
(74) *Attorney, Agent, or Firm* — Bradley Arant Boult Cummings LLP; Henry B. Ward, III

(57) ABSTRACT

An antenna package, comprising an antenna and a protective enclosure for the antenna, the enclosure comprising a case element and at least one guard element and at least one handle attached to the case element. The antenna is secured inside the case element. The enclosure can also comprise mounting hardware for mounting the antenna. The enclosure has at least one connector for the antenna, and, in some embodiments, has a connector protector element configured to protect the connector from damage. The enclosure can be any suitable size or shape. In some embodiments, guard elements and/or handles can be omitted or be removable.
(Continued)

The antenna package is suitable for temporary installation and for repeated installation and deinstallation. A transport unit for securing the protective enclosure during transport is also disclosed. In some embodiments, the transport unit is modifiable by a user.

15 Claims, 7 Drawing Sheets

(51) Int. Cl.

| | |
|---|---|
| ***A45C 13/36*** | (2006.01) |
| ***H01Q 1/12*** | (2006.01) |
| ***H01Q 1/42*** | (2006.01) |

(56) References Cited

U.S. PATENT DOCUMENTS

| | | | | |
|---|---|---|---|---|
| 8,026,864 | B2 * | 9/2011 | Noro | H01Q 1/38<br>343/846 |
| 2007/0241155 | A1 * | 10/2007 | Trajkovic | H04B 1/086<br>224/579 |
| 2011/0174809 | A1 | 7/2011 | Dubois et al. | |
| 2011/0277892 | A1 * | 11/2011 | Black | A45C 1/06<br>150/148 |
| 2018/0351248 | A1 * | 12/2018 | Kim | H01Q 1/08 |

* cited by examiner

PROTECTIVE ANTENNA PACKAGE AND TRANSPORT UNIT THEREFOR

TECHNICAL FIELD

The present invention relates to antennas. More specifically, the present invention relates to protecting antennas from damage and wear.

BACKGROUND

Radio antennas are used in a variety of applications that include the transmission and reception of radio signals. In particular, base station antennas (BSAs) comprising planar antennas are commonly used for small-scale applications and/or temporary use, because of their comparative ease of manufacture and relative portability. Such uses include temporary uses, such as boosting telecom access in areas with limited signals via mobile sites, e.g., “cell on wheels” applications. Additionally, base station antenna infrastructures are commonly used to increase signal access for events such as concerts or other large gatherings and/or in emergencies (e.g., disaster recovery efforts following incidents such as storms, floods, etc.). The antennas are commonly mounted on mobile towers to increase their efficacy.

However, repeated installation and uninstallation of antennas for such uses exposes the antennas to significant risk of damage and wear. Although such antennas are commonly enclosed in a protective casing (“enclosure”), to form a unitary “antenna package”, the enclosure itself is often at risk and easily damaged. In particular, as should be clear, enclosures are generally constructed of materials (e.g., thin plastics such as acrylonitrile butadiene styrene (ABS), Fibre Reinforced Plastic (FRP), and other generally thin materials) that do not interfere with the operations of the protected antenna elements. Such materials may offer protection from weather-related harms when the antenna package is installed on a tower, but generally afford little protection from the wear and tear associated with frequent movement of an antenna for temporary and/or emergency use. Further, enclosed antennas are commonly shipped and otherwise transported in cardboard boxes or other flimsy containers. Although such packaging may, in some cases, be sufficient for initial transport or shipping of antenna packages, they are rarely sturdy enough to provide long-term protection for repeated transport of antenna packages for temporary use and/or antenna packages that are easily movable and/or transportable.

Accordingly, there is a need for a protective enclosure for an antenna that allows for easy installation and uninstallation of antennas for temporary/emergency uses while reducing the risk of damage associated with such movement. Additionally, there is a need for devices that enable the secure transport of such antenna packages/enclosures.

SUMMARY

This document discloses an antenna package, comprising an antenna and a protective enclosure for the antenna, the enclosure comprising a case element and at least one guard element and at least one handle attached to the case element. The antenna is secured inside the case element. The enclosure can also comprise mounting hardware for mounting the antenna. The enclosure has at least one connector for the antenna, and, in some embodiments, has a connector protector element configured to protect the connector from damage. The enclosure can be any suitable size or shape. In some embodiments, guard elements and/or handles can be omitted or be removable. The antenna package is suitable for temporary installation and for repeated installation and deinstallation, at a single location or at multiple locations. A transport unit for securing the protective enclosure during transport is also disclosed. In some embodiments, the transport unit is modifiable by a user.

In a first aspect, this document discloses an antenna package comprising an antenna and a protective enclosure for said antenna, said enclosure comprising: a case element, wherein said antenna is securely contained within said case element; at least one guard element attached to an exterior of said case element; and at least one handle attached to said exterior of said case element, wherein said case element has at least one connector having a first end connected to said antenna, such that a second end of said connector extends outside of said case element and said second end of said connector is connectable to an external device, to thereby couple said antenna to said external device, wherein said case element is permeable to frequencies at which said antenna operates, and wherein said antenna package is portable.

In another embodiment, this document discloses an antenna package wherein a placement of said at least one guard element and said at least one handle permits operations of said antenna.

In another embodiment, this document discloses an antenna package wherein said enclosure is configured to accommodate a planar antenna.

In another embodiment, this document discloses an antenna package wherein said enclosure has a shape that is a cuboid.

In another embodiment, this document discloses an antenna package wherein said enclosure has a shape that is one of: a rectangular cuboid and an oblong cuboid.

In another embodiment, this document discloses an antenna package wherein said enclosure has a shape that is a prismatoid.

In another embodiment, this document discloses an antenna package wherein at least one face of said enclosure is one of concave and convex.

In another embodiment, this document discloses an antenna package wherein said at least one guard element is disposed near an edge of said case element.

In another embodiment, this document discloses an antenna package further comprising at least one mounting bracket attached to said exterior of said case element.

In another embodiment, this document discloses an antenna package wherein said at least one mounting bracket is disposed on a rear face of said case element.

In another embodiment, this document discloses an antenna package wherein said at least one guard element is constructed of at least one of: rubber, wood, and plastic.

In another embodiment, this document discloses an antenna package wherein said case element comprises a UV-stable material.

In another embodiment, this document discloses an antenna package further comprising at least one connector protector element configured to protect said at least one connector.

In another embodiment, this document discloses an antenna package wherein said connector protector extends further from said case element than does said at least one connector.

In another embodiment, this document discloses an antenna package wherein said antenna is a base station antenna.

In a second aspect, this document discloses a transport unit for a protective enclosure for an antenna, wherein said transport unit is configured to securely and removably receive said enclosure, wherein said transport unit is transportable, and wherein exterior walls of said transport unit are rigid to thereby protect said enclosure during transport.

In another embodiment, this document discloses a transport unit wherein said transport unit is collapsible.

In another embodiment, this document discloses a transport unit wherein said transport unit is nestable with other transport units.

In another embodiment, this document discloses a transport unit wherein an interior configuration of said transport unit is configurable to securely and removably receive a plurality of protective enclosures.

In a third aspect, this document discloses a protective enclosure for an antenna, said enclosure comprising: a case element, wherein said antenna is securely contained within said case element; and at least one of: at least one guard element attached to an exterior of said case element; and at least one handle attached to said exterior of said case element, wherein said case element has at least one connector having a first end connected to said antenna, such that a second end of said connector extends outside of said case element and said second end of said connector is connectable to an external device to thereby couple said antenna to said external device, wherein said case element is permeable to frequencies at which said antenna operates, and wherein, when said antenna is contained in said enclosure, said enclosure is portable.

BRIEF DESCRIPTION OF THE DRAWINGS

The present invention will now be described by reference to the following figures, in which identical reference numerals refer to identical elements and in which.

DETAILED DESCRIPTION

Figure 1:
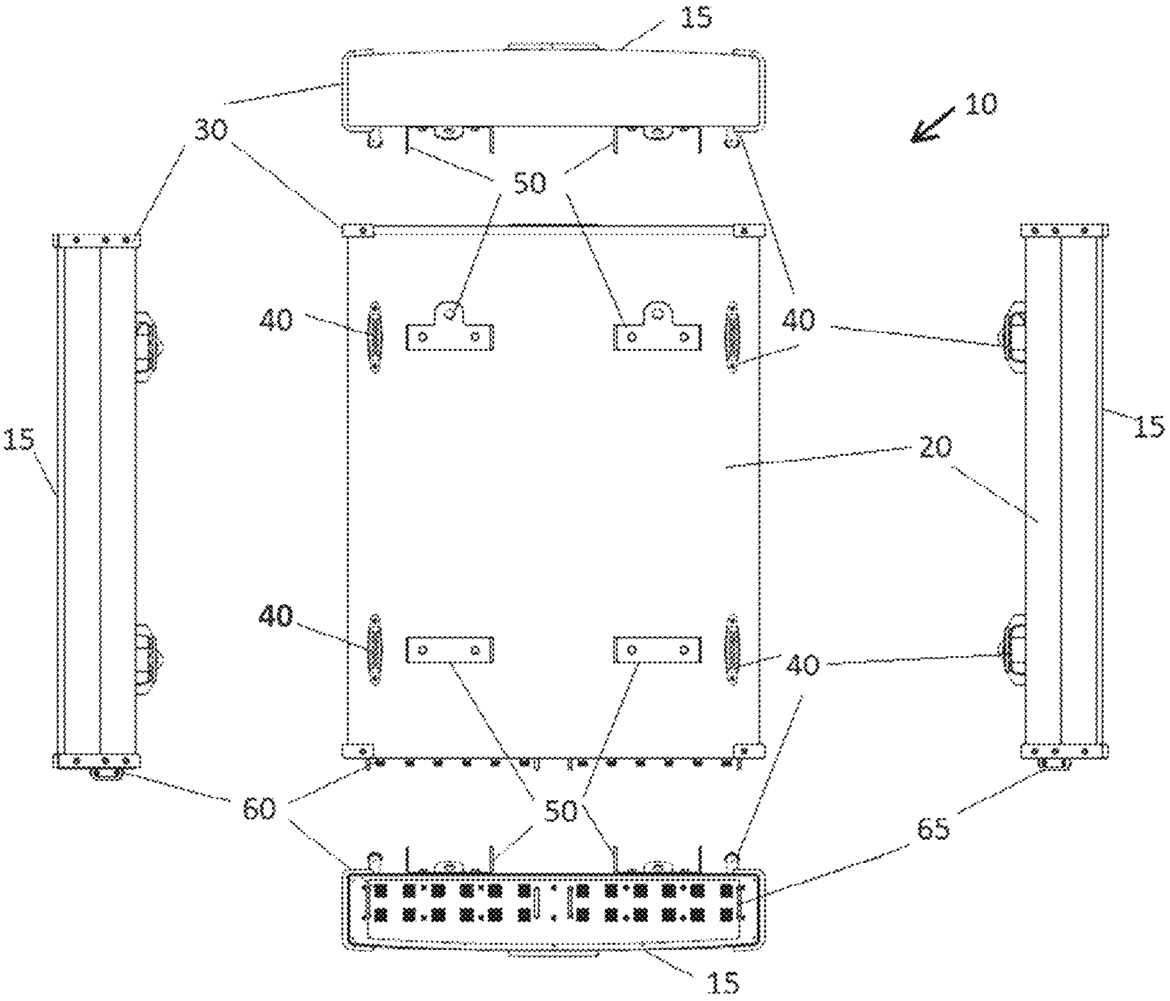
FIG. 1 is an antenna package according to an aspect of the present invention, showing top, left, bottom, right, and rear views.

This document discloses a protective enclosure for an antenna package that reduces the risk of damage to the antenna and to the enclosure itself. In one embodiment, the enclosure comprises a case element, at least one guard element attached to the case element, and at least one handle attached to the case element. The antenna is securely contained within the case element. The case element has at least one connector that extends from the antenna element, to enable the antenna element to be connected to a receiver or transmitter. This document also discloses a transport unit which securely receives the protective enclosure in order to allow for secure transport of encased antennas over long distances.

The protective enclosure comprises a material that does not interfere with the operations of the antenna—that is, the protective enclosure is at least in part permeable to frequencies at which the encased antenna operates. As should be clear, different antennas operating at different frequencies may be protected by different enclosures. Similarly, of course, different antenna elements may be protected by the same kind of enclosure, provided the enclosure material is suitable for use with those antenna elements. Accordingly, an enclosure according to this invention may be made of any material considered suitable for any given use. Note that the enclosure is, preferably, made of non-ferrous and UV-stable materials (i.e., materials that do not degrade with exposure to ultraviolet (UV) light).

An antenna element is securely contained within the case element, which is sealed or formed around the antenna element. Connectors from the antenna extend outside of the case element and may be connected to external device(s), to thereby couple the antenna to the external device(s). In some embodiments, the connector is securely attached to the case element. In other embodiments, however, the connector is a separate component that is inserted through an aperture in the case element, such that one end of the connector is inside the case element, to connect with the antenna, and another end of the connector is outside the case element, to connect with the external device(s).

Additionally, in some embodiments, the enclosure further comprises a connector protector element configured to protect the at least one connector. In some embodiments, the connector protector element(s) can be in the form of bars or protrusions that extend from the case element, and that extend further from the case element than do the connectors themselves. In some embodiments, the connector protector element(s) are securely attached to the case element, while, in other embodiments, the connector protector element(s) are detachable.

These connector protector elements protect the connectors during antenna installation and removal: that is, they prevent the antenna package from resting on the connectors themselves while the antenna package is being prepared for installation. Resting the package/enclosure directly on the connectors risks damaging the connectors and thereby negatively affecting the performance of the antenna. To provide sufficient protection, there are preferably at least two connector protector elements extending from the enclosure. However, in some embodiments, a single connector protector element may be used (for instance, a single connector protector element may form an encircling ring or lip around all of the connectors).

Further, in a preferred embodiment, the at least one guard element and at least one handle of the protective enclosure are attached to the case element in such a way as to not interfere with the operations of the antenna (i.e., the transmission and/or receipt of signals). The suitable locations, numbers, and configurations of such elements may thus depend on the antennas used and on the application for which those antennas are used.

The at least one guard element preferably comprises non-metallic material, such as rubber, plastics, or wood. The guard element is preferably narrow and, in some embodiments, located at an edge of the enclosure. Such a configuration would help protect against edge or corner impacts and/or scratches on the enclosure, while generally not interfering with the operations of the antennas. The guard elements may be attached to the case element using any suitable means, including without limitation glues and other adhesives, locking features, fasteners such as screws, nails, and/or rivets, welding, and/or any combination thereof.

The at least one handle can comprise any suitable material, including both ferrous and non-ferrous metals, plastics including polymers, thermoset plastics, and thermoplastics, woods, rubber, etc. Additionally, in some embodiments, the handles may comprise high-contrast and/or reflective or photo-reflective materials, or be coated in such materials, in order to allow for easier visual distinction between the handle and the case element. The handle(s) may be attached to the case element using any suitable means, including without limitation glues and other adhesives, locking features, fasteners such as screws, nails, and/or rivets, welding, and/or any combination thereof. Further, the handles may in some cases be attached to other attachments on the enclosure (e.g., in some embodiments, a handle may be attached to the enclosure by way of a guard element). The at least one handle preferably facilitates easy handling of the enclosure/antenna package, for installation/deinstallation.

In some embodiments, mounting bracket(s) are also attached to the case element. Such brackets (or other suitable mounting equipment) can be used to secure the encased antenna to a tower or other structure when in use.

The shape and size of the enclosure may also depend on the intended or desired use. For instance, when planar antennas are used, enclosures are commonly cuboids (i.e., "box-shaped"). These may be rectangular cuboids, in which each face of the box is a rectangle, oblong cuboids having rounded or beveled vertices, or other types of cuboids as appropriate. However, depending on the implementation, one or more faces of the enclosure may be concave or convex, and the faces may be any suitable shape, including, broadly, prisms and prismatoids. Further, antennas that are not planar antennas may have enclosures of any suitable shape, including, without limitation, rounded shapes.

Further, there may be implementations for which alternative enclosure designs are preferable (e.g., enclosures that do not have any guard elements, or enclosures that do not have handles). For instance, depending on the shape and size of an enclosure, handles may not be necessary.

Additionally, as should be clear, the antenna within the protective enclosure may be connected to a receiver, a transmitter, a transceiver, or any other suitable device known in the art. Additionally, of course, the at least one connector of the antenna may be connected to any suitable adapter or combination of adapters, to thereby connect the antenna to any other suitable device.

Referring now to FIG. 1, a protective enclosure according to one embodiment of the invention is shown. In the centre of the image is a rear view of the protective enclosure 10 according to this embodiment. Above that rear view is a view from the top of the enclosure; below the rear view is a view from the bottom of the enclosure; and views from each side are shown on each side.

As can be seen, the enclosure 10 in this embodiment has one slightly convex face (the 'front face' 15 which can be seen in the top view), three guard elements 30 disposed around the top edge of the case element 20 and three guard elements 30 disposed around the bottom edge, four handles 40 attached to the rear face, and four mounting brackets 50 also attached to the rear face. Additionally, this enclosure 10 has a number of connectors 60 extending from the bottom face of the enclosure 10, and connector protector elements 65 extending on either side of the connectors 60. These connector protector elements 65 extend slightly further from the enclosure 10 than do the connectors 60, in order to protect the connectors 60 from contact with the ground and/or other surfaces. As described above, however, the details of this configuration are purely exemplary and should not be taken as limiting the invention in any way.

Figure 2:
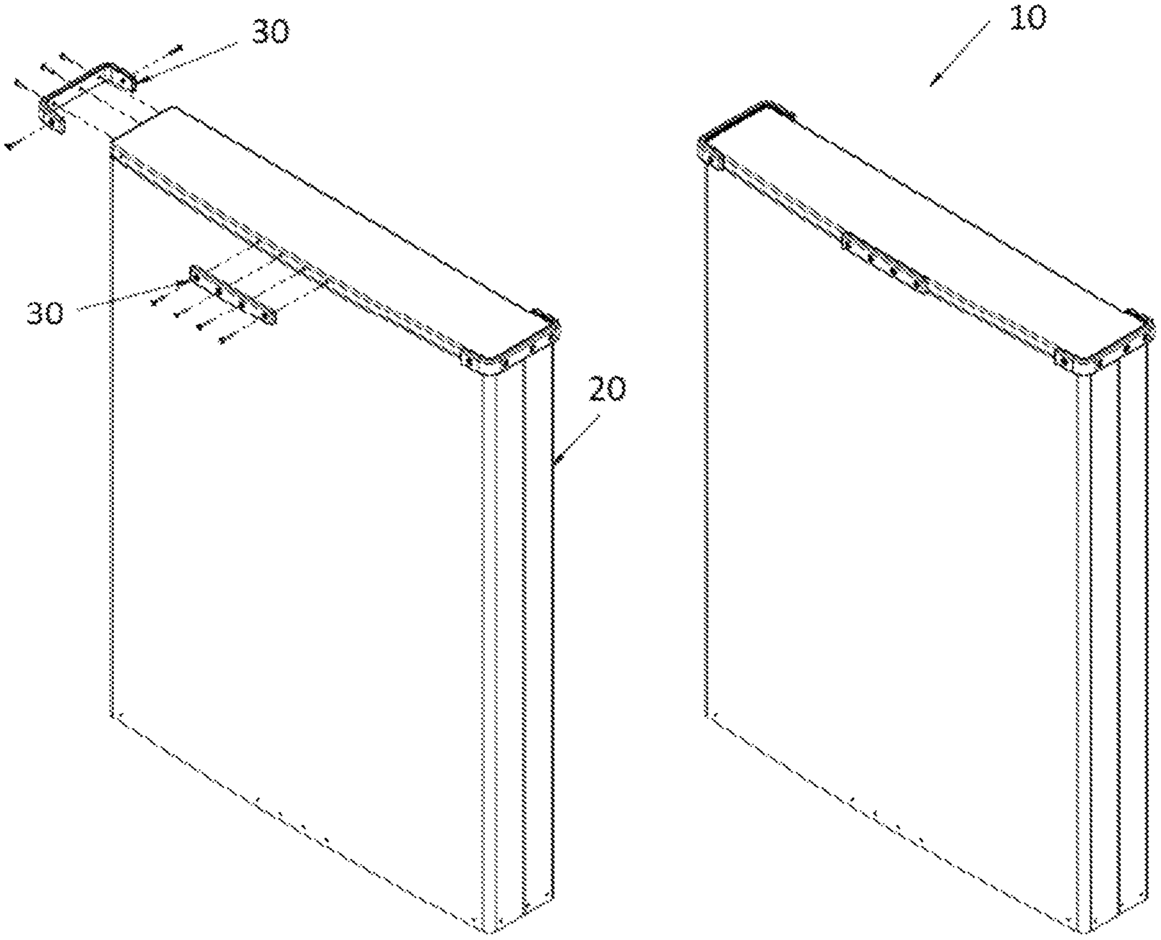
FIG. 2 shows the protective enclosure of FIG. 1 with guard elements being mounted along a top edge of the enclosure.
Figure 3:
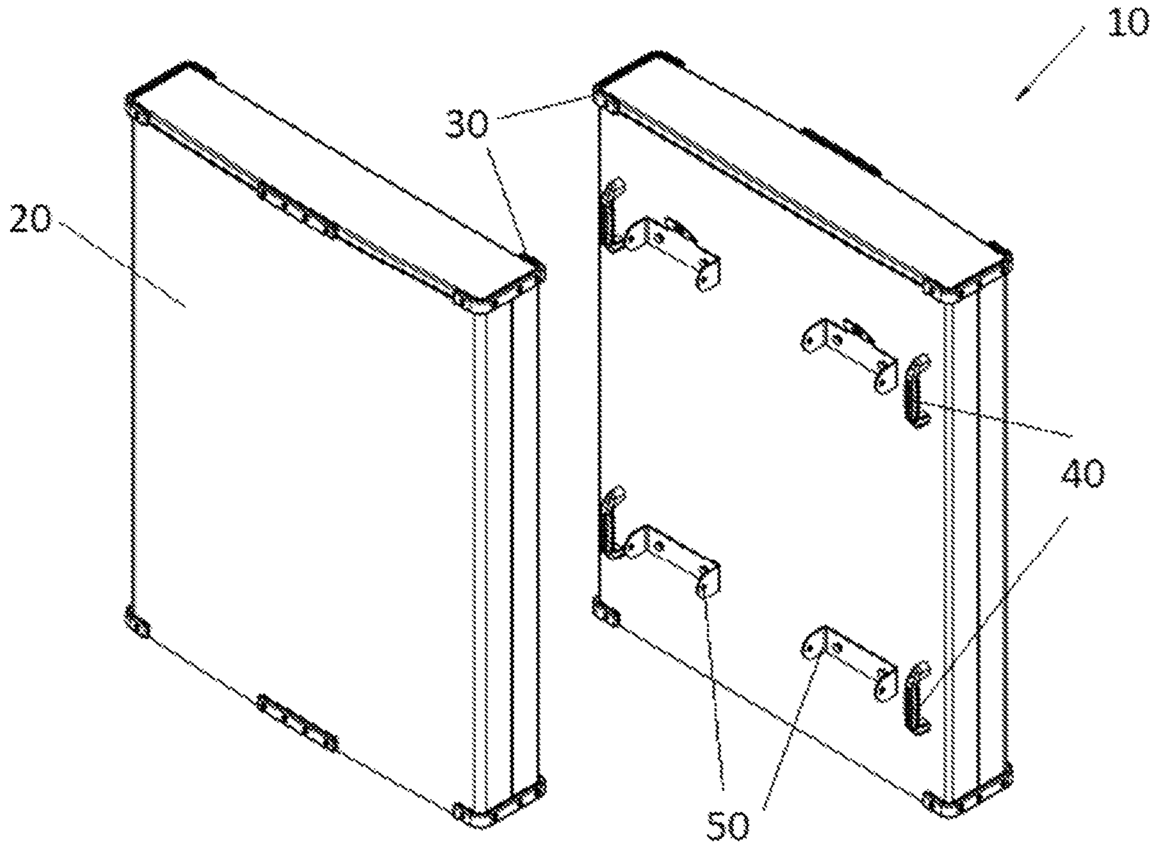
FIG. 3 shows the protective enclosure of FIG. 1 with guard elements, handles, and mounting brackets attached to the protective enclosure.

FIG. 2 shows the enclosure 10 of FIG. 1. At the left of FIG. 2, a partially exploded view is shown, in which one guard element 30 has been attached to the case element 20 and two guard elements 30 are shown in exploded view. FIG. 2 shows attachment of the guard elements 30 via rivets; however, as described above, many attachment mechanisms can be used. The right side of FIG. 2 shows an assembled view of the enclosure 10 of FIG. 1, with the three guard elements 30 attached at the top edge of the enclosure 10. FIG. 3 shows two views of the enclosure 10 of FIG. 1. The image on the left is a front perspective view of the enclosure 10 and the image on the right is a rear perspective view of the enclosure 10 showing the brackets and the handles.

Figure 4:
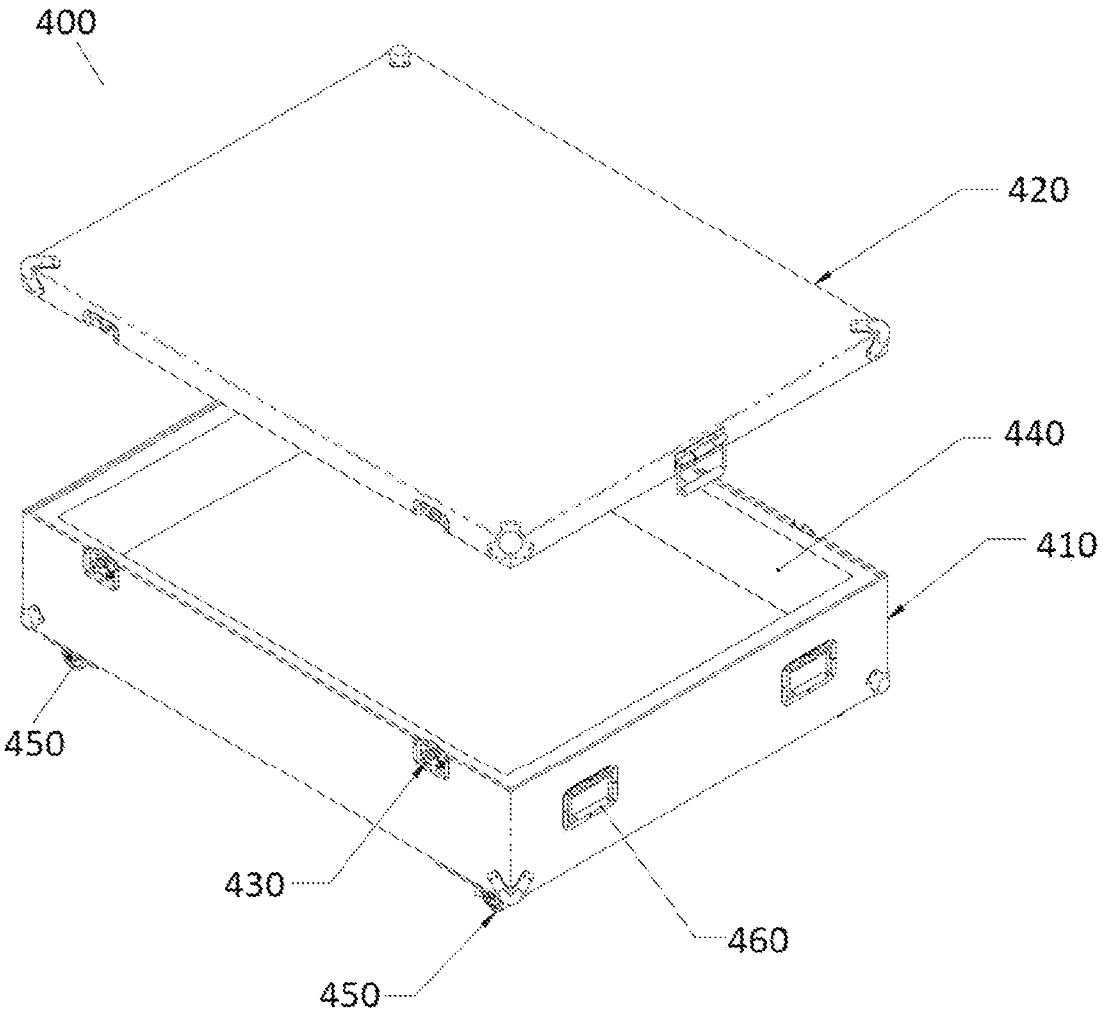
FIG. 4 is a schematic of an embodiment of a transport unit according to another aspect of the invention.

Referring now to FIG. 4, a transport unit 400 according to one aspect of the invention is shown. This embodiment of the transport unit 400 has a lower container portion 410, in which at least one antenna package/protective enclosure is to be contained and a lid portion 420. In this embodiment, the lid portion 420 is completely removable from the container portion 410 and is securable to the container portion 410 by way of latches 430. Of course, in some embodiments, the lid portion 420 is attached to the container portion 410 by hinges and is thus not completely removable from the transport unit 400.

As noted above, the case element of the enclosure is generally made of light and/or thin materials that are not designed to protect against all impacts. The interior of the transport unit is preferably fitted with rigid panels, straps, and/or padding so that antenna enclosures as described herein can be removably secured for transport. The interior configuration of the transport unit can be predetermined or, in some embodiments, can be configurable by the user. The transport unit 400 shown in FIG. 4 has rigid walls lined with foam padding 440, in order to protect the antenna package during transport. As should be clear, there is no inherent limit on the number or shape of the enclosures/antenna packages that can be secured in a single transport unit, provided that the internal space is large enough such that each antenna package can be secured.

The transport unit is mobile or transportable and preferably fitted with wheels 450 or other rollers (including, without limitation, casters or any form of circular fittings capable of rotating about an axle) to enable easy movement. In some embodiments, the wheels or rollers can be lockable, to secure the transport unit (e.g., in a truck on the way to a site). As would be understood, the number of wheels/rollers 450 can depend on the size of the transport unit, the type of wheel/rollers used, and/or the desired implementation.

The transport unit can also be fitted with at least one handle 460 to facilitate mobility. The handle 460 may be built-in to the transport unit, attached to the transport unit's exterior, and/or extended or extendable from the transport unit. The transport unit is preferably easy to clean and repair, and comprises modular and/or easily modifiable parts that are easy to replace. In some preferred configurations, the transport unit is collapsible and or nestable/stackable with other transport units, to allow for convenient storage.

Figure 5A:
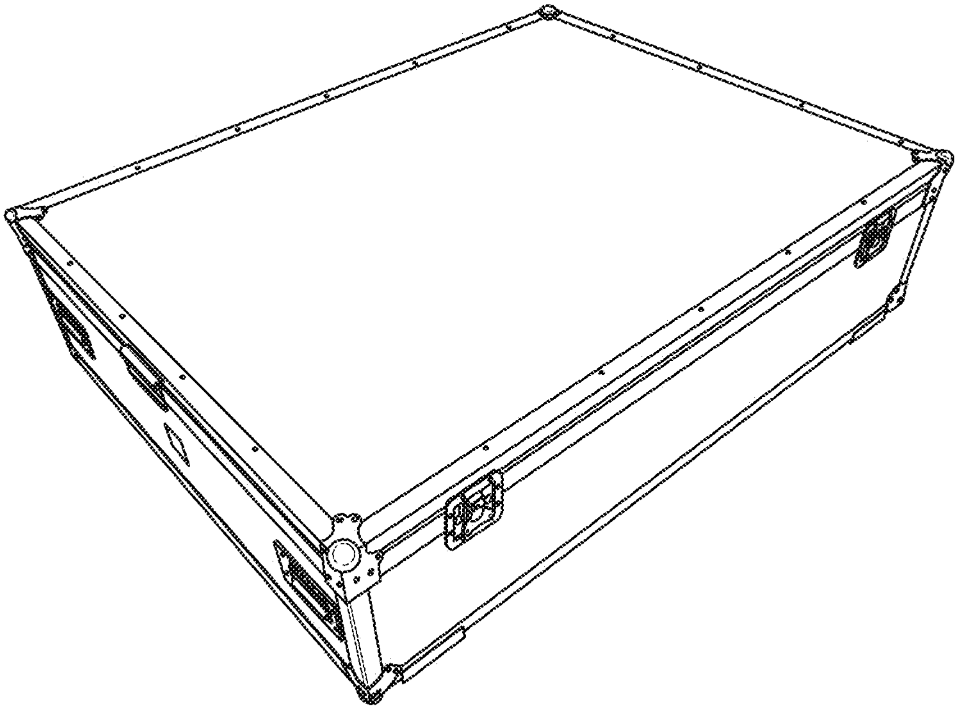
FIGS. 5A to 5D show a transport unit implemented according to the embodiment of FIG. 4, in various configurations.
Figure 5B:
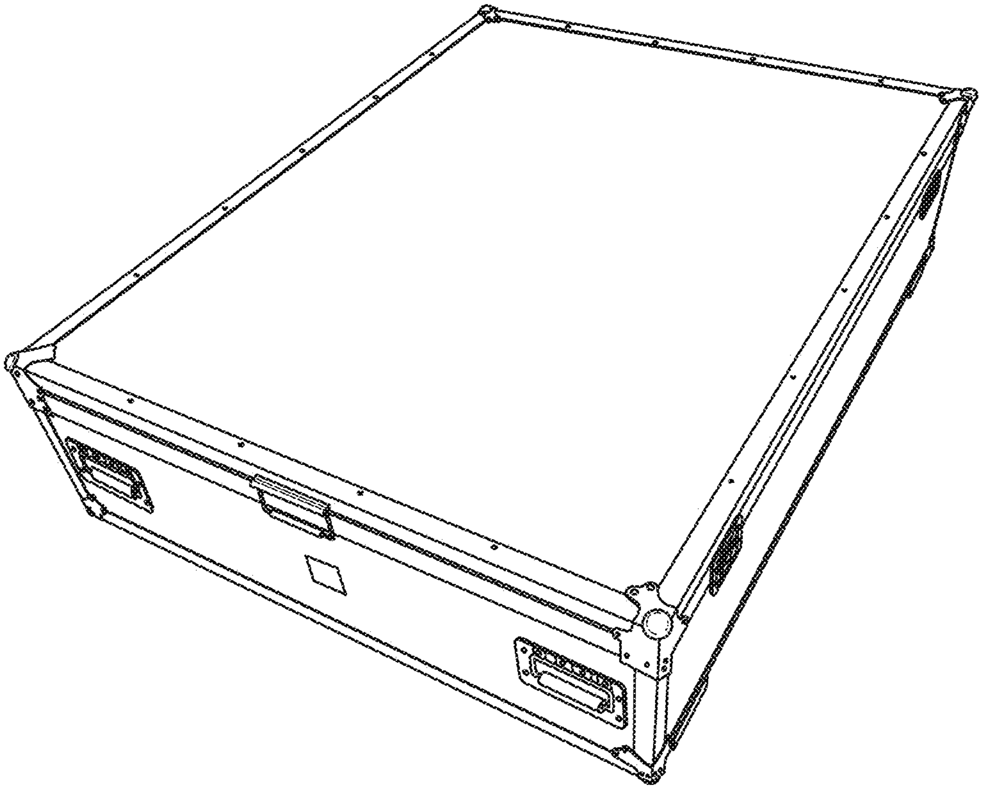
Figure 5C:
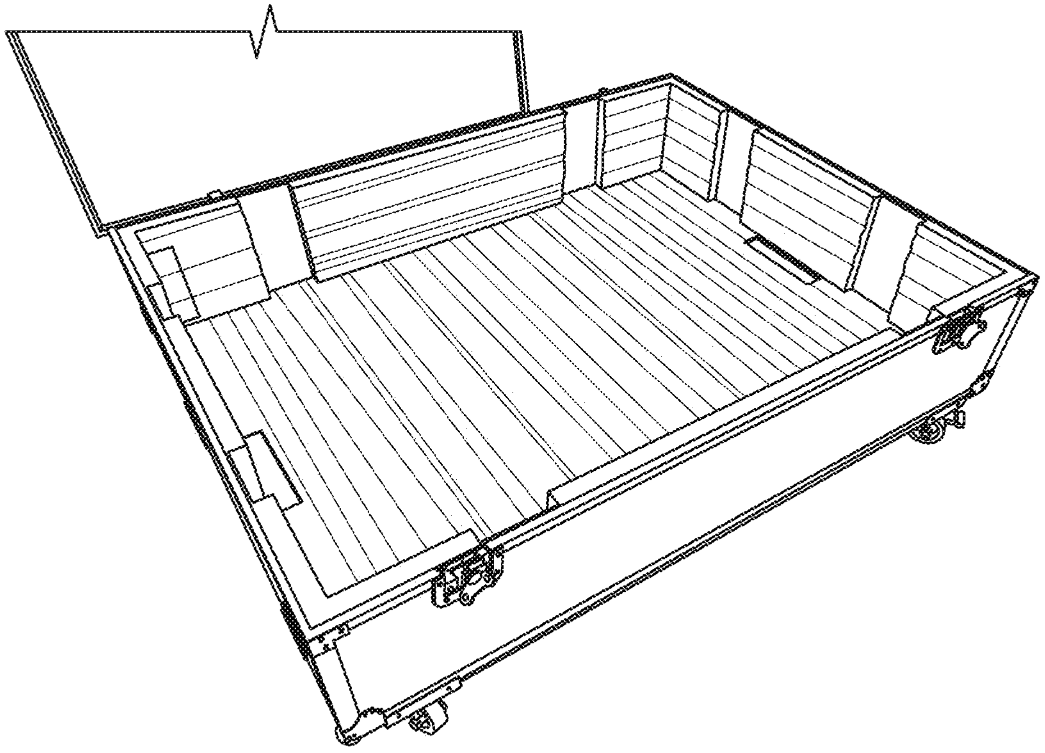
Figure 5D:
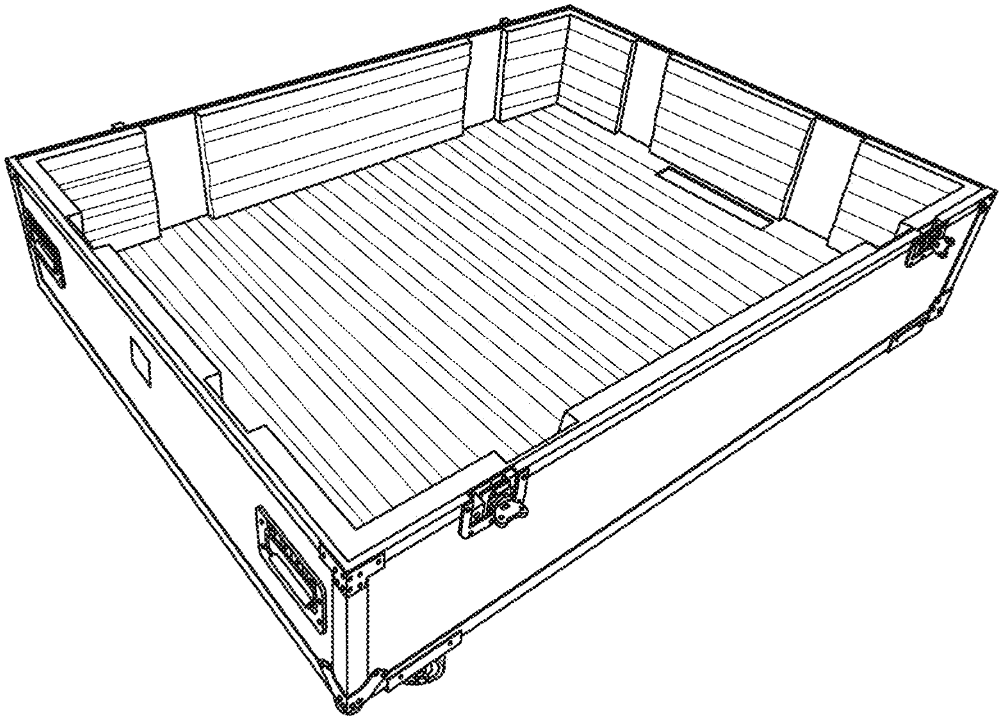

FIGS. 5A to 5D show a transport unit as in FIG. 4 in various configurations. Specifically, in FIG. 5A, a closed transport unit is shown. FIG. 5B shows the closed transport unit of FIG. 5A from a different angle, in which the handles 460 may be more clearly seen. FIG. 5C shows the transport unit of FIG. 5A with the lid portion 420 removed (the lid portion 420 may be seen resting against a wall in the background of the image). In this view, the foam padding 440 inside the transport unit is clearly shown. FIG. 5D shows the transport unit of FIG. 5A with the lid portion 420 removed (i.e., FIG. 5D shows only the container portion 410 of the transport unit 400.

Figure 6:
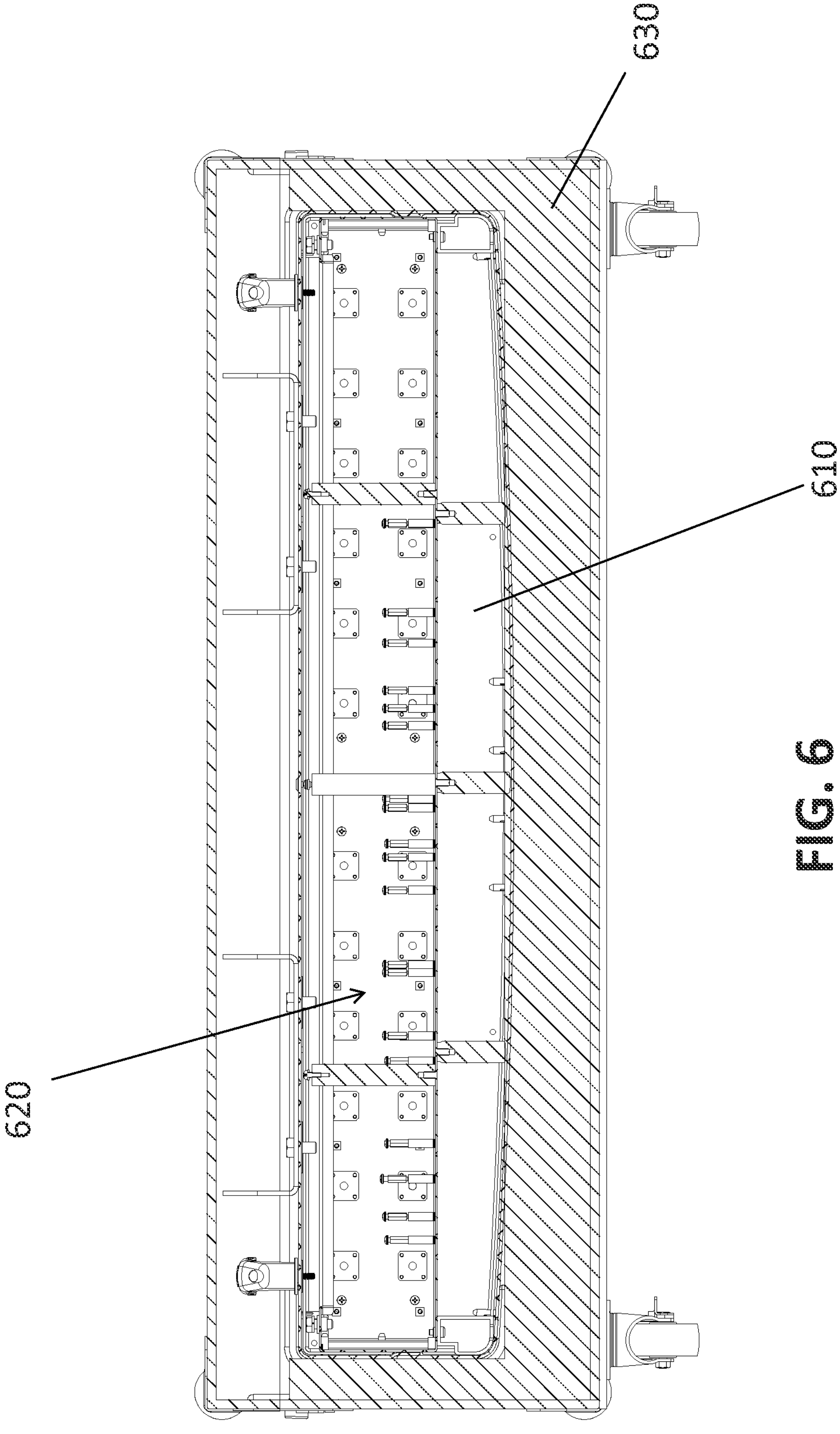
FIG. 6 shows a cutaway view of an antenna package within a transport unit.

FIG. 6 is a cutaway view showing the interior of an antenna package according to an aspect of the invention. The antenna package comprises a protective enclosure 610 that surrounds an antenna 620. As would be clear, the antenna 620 and protective enclosure 610 are, in some embodiments, manufactured as a single unit and/or as part of a single manufacturing process. That is, such an interior view would not be visible once the antenna package is completed. As would also be clear, the specific configuration of the antenna 620 within the protective enclosure 610 shown in this figure is purely exemplary, and nothing in this figure should be construed as limiting the possible configuration of antennas, ports, etc., of the antenna package described herein in any way.

Additionally, FIG. 6 shows the antenna package within a transport unit 630. This transport unit 630 is similar to that described with reference to FIGS. 4 and 5A to 5D. Of course, again, any suitable geometry and configuration of the transport unit 630 may be used.

For clarity, the expression "at least one of [x] and [y]", as used herein, means and should be construed as meaning "[x] or [y] or both [x] and [y]".

A person understanding this invention may now conceive of alternative structures and embodiments or variations of the above all of which are intended to fall within the scope of the invention as defined in the claims that follow.

We claim:

1. An antenna package comprising an antenna and a protective enclosure for said antenna, said enclosure comprising:

a case element, wherein said antenna is securely contained within said case element, said case element having shape that is a cuboid, said shape having with a front face, a rear face, and four side faces, each side face being perpendicular to said front face and to said rear face;

at least one guard element attached to an exterior of said case element; and at least one handle attached to said exterior of said case element, wherein said antenna package has a plurality of connectors, each connector having a first end connected to said antenna and a second end that extends outside of said case element such that said second end of said connector is connectable to an external device, to thereby couple said antenna to said external device, wherein said case element is permeable to frequencies at which said antenna operates;

wherein said plurality of connectors extends from said side faces;

wherein said enclosure further comprises at least two connector protectors, each of said at least two connector protectors extending from one of said side faces; and wherein each of said connector protectors comprises a U-shaped bar having two extending portions and a central portion that connects the two extending portions, wherein ends of said two extending portions are attached to a side face of said case element and wherein said extending portions are longer than each of said plurality of connectors, such that each of said connector protectors extends further from said side face than each of said plurality of connectors.

2. The antenna package according to claim 1, wherein a placement of said at least one guard element and said at least one handle permits operations of said antenna.

3. The antenna package according to claim 1, wherein said enclosure is configured to accommodate a planar antenna.

4. The antenna package according to claim 3, wherein said enclosure has a shape that is a prismatoid.

5. The antenna package according to claim 4, wherein either said front face or said rear face of said enclosure is one of concave and convex.

6. The antenna package according to claim 1, wherein said enclosure has a shape that is one of: a rectangular cuboid and an oblong cuboid.

7. The antenna package according to claim 1, wherein said at least one guard element is disposed near an edge of said case element.

8. The antenna package according to claim 1, further comprising at least one mounting bracket attached to said exterior of said case element.

9. The antenna package according to claim 8, wherein said at least one mounting bracket is disposed on said rear face of said case element.

10. The antenna package according to claim 1, wherein said at least one guard element is constructed of at least one of: rubber, wood, and plastic.

11. The antenna package according to claim 1, wherein said case element comprises a UV-stable material.

12. The antenna package according to claim 1, wherein said antenna is a base station antenna.

13. The antenna package according to claim 1 wherein said at least two connector protectors comprises a specific pair of connector protectors, said specific pair of connector protectors being adjacent to at least two of said plurality of connectors such that said at least two of said plurality of connectors is between said specific pair of connector protectors.

14. A protective enclosure for an antenna, said enclosure comprising:

a case element, wherein said antenna is securely contained within said case element, said case element having shape that is a cuboid, said shape having with a front face, a rear face, and four side faces, each side face being perpendicular to said front face and to said rear face; and at least one of:

at least one guard element attached to an exterior of said case element; and at least one handle attached to said exterior of said case element, wherein said case element has a plurality of connectors, each connector having a first end connected to said antenna, such that a second end of said connector extends outside of said case element and said second end of said connector is connectable to an external device, to thereby couple said antenna to said external device, wherein said case element is permeable to frequencies at which said antenna operates;

wherein said plurality of connectors extends from said side faces;

wherein said case element further comprises at least two connector protectors, each of said at least two connector protectors extending from one of said side faces; and wherein each of said connector protectors comprises a U-shaped bar having two extending portions and a central portion that connects the two extending portions, wherein ends of said two extending portions are attached to a side face of said case element and wherein said extending portions are longer than each of said plurality of connectors, such that each of said connector protectors extends further from said side face than each of said plurality of connectors.

15. The enclosure according to claim 14 wherein said at least two connector protectors comprises a specific pair of connector protectors, said specific pair of connector protectors being adjacent to at least two of said plurality of connectors such that said at least two of said plurality of connectors is between said specific pair of connector protectors.

* * * * *